United States Patent
Krämer et al.

(10) Patent No.: US 10,407,539 B2
(45) Date of Patent: Sep. 10, 2019

(54) DEOXYBENZOIN CONTAINING FLAME RETARDANT POLYMER COMPOSITIONS

(71) Applicants: BASF SE, Ludwigshafen (DE); University of Massachusetts, Boston, MA (US)

(72) Inventors: Roland Helmut Krämer, Mannheim (DE); Sebastian Wagner, Ludwigshafen (DE); Peter Deglmann, Mannheim (DE); Motonori Yamamoto, Mannheim (DE); Todd Emrick, South Deerfield, MA (US); Aabid Mir, Amherst, MA (US)

(73) Assignees: BASF SE, Ludwigshafen (DE); University of Massachusetts, Boston, MA (US)

( * ) Notice: Subject to any disclaimer, the term of this patent is extended or adjusted under 35 U.S.C. 154(b) by 0 days.

(21) Appl. No.: 15/518,018

(22) PCT Filed: Oct. 9, 2015

(86) PCT No.: PCT/EP2015/073355
§ 371 (c)(1),
(2) Date: Apr. 10, 2017

(87) PCT Pub. No.: WO2016/055604
PCT Pub. Date: Apr. 14, 2016

(65) Prior Publication Data
US 2017/0306084 A1    Oct. 26, 2017

Related U.S. Application Data

(60) Provisional application No. 62/062,181, filed on Oct. 10, 2014.

(51) Int. Cl.
| | |
|---|---|
| *B29D 7/01* | (2006.01) |
| *B29D 99/00* | (2010.01) |
| *C08G 63/19* | (2006.01) |
| *C08G 63/672* | (2006.01) |
| *C08K 3/016* | (2018.01) |
| *C08K 3/08* | (2006.01) |
| *C08K 3/16* | (2006.01) |
| *C08K 3/20* | (2006.01) |
| *C08K 3/28* | (2006.01) |
| *C08K 3/32* | (2006.01) |
| *C08K 3/38* | (2006.01) |
| *C08K 5/00* | (2006.01) |
| *C08K 7/14* | (2006.01) |
| *C08L 67/02* | (2006.01) |
| *C08L 77/00* | (2006.01) |
| *C08L 77/02* | (2006.01) |

(52) U.S. Cl.
CPC ............... *C08G 63/19* (2013.01); *B29D 7/01* (2013.01); *B29D 99/0078* (2013.01); *C08G 63/672* (2013.01); *C08K 3/016* (2018.01); *C08K 3/08* (2013.01); *C08K 3/16* (2013.01); *C08K 3/20* (2013.01); *C08K 3/28* (2013.01); *C08K 3/32* (2013.01); *C08K 5/0066* (2013.01); *C08K 7/14* (2013.01); *C08L 67/02* (2013.01); *C08L 77/00* (2013.01); *C08L 77/02* (2013.01); *B32B 2262/0261* (2013.01); *B32B 2262/0284* (2013.01); *C08K 2003/387* (2013.01)

(58) Field of Classification Search
CPC .... C08G 63/19; C08G 63/672; C08K 3/0058; C08K 3/32; C08K 3/28; C08K 3/20; C08K 3/16; C08K 3/08; C08K 3/016; C08K 2003/387; C08K 5/0066; C08K 7/14; C08L 67/02; C08L 77/02; C08L 77/00; B29D 7/01; B29D 99/0078; B32B 2262/0261; B32B 2262/0284
See application file for complete search history.

(56) References Cited

U.S. PATENT DOCUMENTS

| | | | |
|---|---|---|---|
| 5,310,808 A | * | 5/1994 | Grey ............... C08F 255/06 525/285 |
| 7,138,448 B2 | | 11/2006 | Kaprinidis et al. |
| 8,314,202 B2 | | 11/2012 | Emrick et al. |

FOREIGN PATENT DOCUMENTS

| | | |
|---|---|---|
| EP | 1288260 A1 | 3/2003 |
| RU | 2344158 C2 | 1/2009 |
| WO | PCT/EP2015/056197 | 3/2015 |
| WO | PCT/EP2015/073355 | 10/2015 |

OTHER PUBLICATIONS

U.S. Appl. No. 14/786,177, filed Oct. 22, 2015.
U.S. Appl. No. 14/898,361, filed Dec. 14, 2015.
U.S. Appl. No. 14/909,757, filed Feb. 3, 2016.
U.S. Appl. No. 14/917,039, filed Mar. 7, 2016.
U.S. Appl. No. 15/102,696, filed Jun. 8, 2016.
U.S. Appl. No. 15/104,408, filed Jun. 14, 2016.
U.S. Appl. No. 15/105,348, filed Jun. 16, 2016.
U.S. Appl. No. 15/300,317, filed Sep. 29, 2016.
U.S. Appl. No. 15/302,876, filed Oct. 7, 2016.
International Search Report and Written Opinion, International Application No. PCT/EP2015/073355, dated Jan. 12, 2016.
International Preliminary Report on Patentability, International Application No. PCT/EP2015/073355, dated Aug. 30, 2016.

(Continued)

*Primary Examiner* — Patrick D Niland
(74) *Attorney, Agent, or Firm* — Marshall, Gerstein & Borun LLP

(57) ABSTRACT

The present invention relates to specific deoxybenzoin containing flame retardant polyesters and flame retardant thermoplastic polymer molding compositions comprising deoxybenzoin containing flame retardant polyesters as well as their preparation and use for producing moldings, fibers or foils.

9 Claims, 1 Drawing Sheet

(56) References Cited

OTHER PUBLICATIONS

Ellzey et al. Deoxybenzoin-Based Polyarylates as Halogen-Free Fire-resistant Polymers, Macromolecules, 39 (10):3553-8 (2006).
Yang, Polyester Alloy Techniques and Applications, China Machine Press, pp. 124-126, Oct. 31, 2010.

* cited by examiner

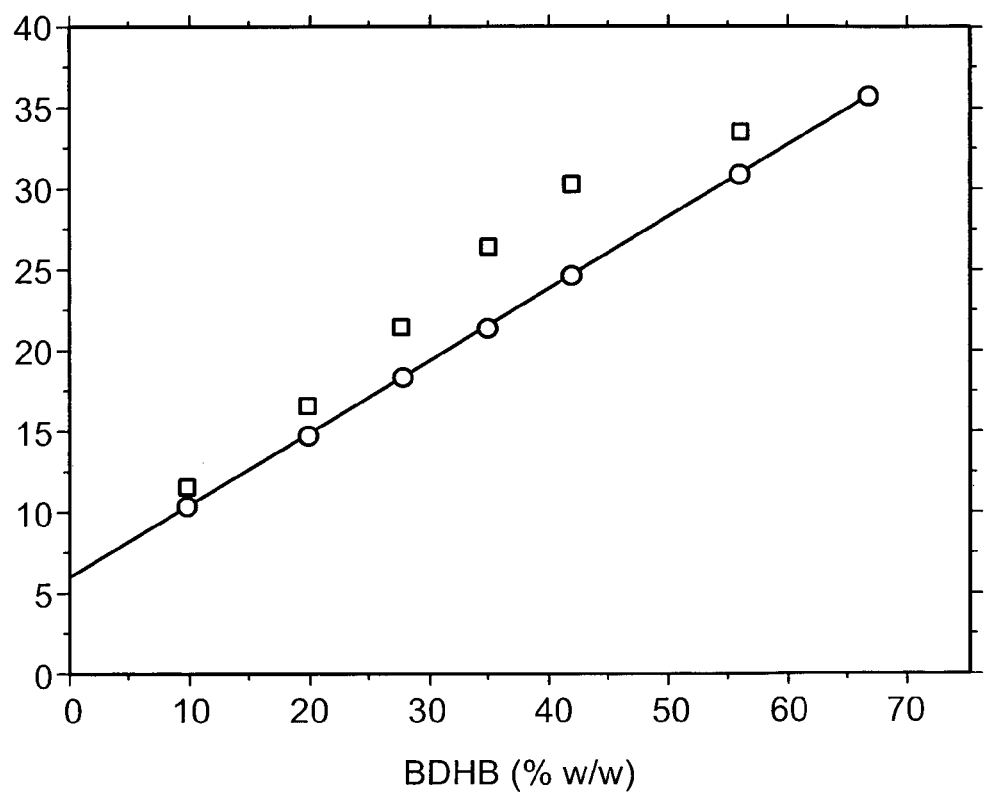

DEOXYBENZOIN CONTAINING FLAME RETARDANT POLYMER COMPOSITIONS

CROSS-REFERENCE TO RELATED APPLICATIONS

This is the U.S. national phase of International Patent Application No. PCT/EP2015/073355, filed Oct. 9, 2015, which claims the benefit of U.S. Provisional Patent Application No. 62/062,181, filed Oct. 10, 2014, incorporated herein by reference in its entirety.

The present invention relates to specific deoxybenzoin containing flame retardant polyesters and flame retardant thermoplastic polymer molding compositions comprising deoxybenzoin containing flame retardant polyesters as well as their preparation and use for producing moldings, fibers or foils.

Thermoplastic polymers like polyamides and polyesters have a high dimensional stability and are therefore employed for a long time as molding materials. Examples are applications in the electronics area, for example housings of electrical parts, and the automobile sector, for example in plugs, sensors and housings. Furthermore, there is an increasing need for halogen free flame retardant polyester molding compositions. These compositions are required to have a bright colour, a sufficient temperature stability upon processing and a flame retardant effectiveness in reinforced and non-reinforced polymers.

The high loadings of flame retardant additives and other ingredients often have a negative influence on the molding material mechanical properties.

Polyesters containing 1,2-bis[4-(2-hydroxyethoxy)phenyl]ethanone units, also called deoxybenzoin units or eBHDB-units hereinafter, are known per se.

U.S. Pat. No. 8,314,202 B2 relates to deoxybenzoin-derived anti-flammable polymers. The specific eBHDB-units were employed in different polymer types including polyesters and polyurethanes.

The respective polyesters can be derived from terephthalic acid derivatives and eBHDB, see scheme A2 in columns 11 and 12. It is stated that the eBHDB-derived polyesters possess desirable flame or fire retardant properties. The reported polyesters were prepared by solution polymerization and highly aromatic polyesters were obtained consisting only of eBHDB and terephthalic acid as repeat units. There is no mention of the mechanical properties of the obtained polyesters and no information on the processing of such polymers. Compatibility with other types of polymers in melt extrusion processes finds no mention.

There is no mention of a combination of the eBHDB-based polymers with other flame retardant additives.

The object underlying the present invention is to provide eBHDB-based polyesters that can be readily obtained by melt polymerization, which can be easily processed with conventional equipment and show good compatibility with other thermoplastic polymers.

The object underlying the present invention is to provide flame retardant thermoplastic polymer molding compositions in which the amount of flame retardant additives like metal salts of a phosphinic acid or halogen containing flame retardant additives as well as flame retardant synergists like melamine compounds and metal oxides can be significantly reduced without impairing the flame retardant properties of the polyester molding composition.

Furthermore, the flame retardant properties of the thermoplastic polymer molding composition should be improved.

The objects are achieved according to the present invention by a flame retardant thermoplastic polymer molding composition, comprising
a) 0 to 99.8 wt.-% of at least one thermoplastic polymer, preferably polyamide or polyester different from component B as component A,
b) 0.1 to 99.9 wt.-% of at least one thermoplastic polyester containing 1,2-bis[4-(2-hydroxyethoxy)phenyl]ethanone units as component B,
c) 0.1 to 50 wt.-% of at least one flame retardant additive, selected from phosphorus containing flame retardant additives, preferably metal salts of a phosphinic acid and halogen containing flame retardant additives, as component C,
d) 0 to 25 wt.-% of at least one flame retardant synergist, different from component C, selected from nitrogen compounds, preferably melamine compounds, or metal borates, metal stannates and metal oxides, as component D,
e) 0 to 60 wt.-% of glass fibers as component E,
f) 0 to 30 wt.-% of at least one further additive, as component F,
wherein the total amount of components A to F is 100 wt.-%.

The objects are furthermore achieved by a process for preparation of these thermoplastic molding compositions comprising mixing the components of the thermoplastic molding compositions.

The objects are furthermore achieved by a method for production of moldings, fibers or foils, comprising the step of processing these thermoplastic molding compositions into the desired form.

The objects are furthermore achieved by a molding, a fiber or a foil composed of the above thermoplastic molding composition.

According to the present invention it has been found that thermoplastic polyesters containing 1,2-bis[4-(2-hydroxyethoxy)phenyl]ethanone units can be employed advantageously in combination with flame retardant additives C and optionally flame retardant synergists D to form thermoplastic polymer molding compositions in which the amount of the components C and D can be reduced in comparison to known compositions.

Furthermore, it has been found according to the present invention that the thermoplastic polyesters containing eBHDB-units can be advantageously admixed with different thermoplastic polymers to form flame retardant thermoplastic polyester molding compositions.

By employing low amounts of eBHDB-units in the polyesters, the flame retardant properties of the molding compositions could be improved to large extent. For example, molding compositions of known polymers like polybutyleneterephthalate (PBT) or polyamide could be improved to a large extent by employing small amounts of eBHDB-units containing thermoplastic polyesters.

When compared with pure PBT, the necessary amount of conventional flame retardant additives or synergists C and D could be reduced significantly while still fulfilling the fire safety requirements. This leads to advantages in the processing of these molding compositions as well as improved mechanical and electrical properties.

The objects are furthermore achieved by a thermoplastic polyester based on at least one aromatic dicarboxylic acid, 1,2-bis[4-(2-hydroxyethoxy)phenyl]ethanone and at least one further diol, or polyol or mixtures thereof, preferably aliphatic $C_{2-12}$-diol as monomers and a process for its preparation.

By employing the further diol higher molecular weights can be obtained and the compatibility with thermoplastic polyester component A increases. Surprisingly, it was found that such polyesters have char yields at high temperature that are higher than the values expected in proportion to the mass fraction of eBHDB found in the polyesters.

The term "comprising" used throughout this text shall also encompass the term "consisting of". Thus, while the term "comprising" does not limit type and amount of further ingredients of the compositions, the term "consisting of" is limited in this respect to the components listed.

Furthermore, the term "units" employed with regard to monomers forming a polymer should be understood, that in a polymer these units are present in polymerized or polycondensed form. Thus, a thermoplastic polyester containing eBHDB-units contains these units as monomer units in polymerized form. It is well understood that polymers should not contain individual free monomers, but the monomers in polymerized or polycondensed form.

Component A

Component A is at least one thermoplastic polymer, preferably polyamide or polyester different from component B. Thus, components A and B cannot be the same.

A list of thermoplastic polymers is given below:
1. Polymers of monoolefins and diolefins, for example polypropylene, polyisobutylene, poly-but-1-ene, poly-4-methylpent-1-ene, polyvinylcyclohexane, polyisoprene or polybutadiene, as well as polymers of cycloolefins, for instance of cyclopentene or norbornene, polyethylene (which optionally can be cross linked), for example high density polymethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different and especially by the following methods:

a) Radical polymerisation (normally under high pressure and at elevated temperature).

b) Catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either α- or π-bond coordinated. These metal complexes may be in the free form or fixed on substrates, typically on activated magnesium chloride, titanium (III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, and amine or silyl ether groups. These catalyst systems are usually termed Phillips, Standard Oil Indiana, Ziegler-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/-ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example C5-C9) including hydrogenated modifications thereof (e.g. tackifiers) and mixtures of polyalkylenes and starch;

The homopolymers and copolymers mentioned above may have a stereo structure including syndiotactic, isotactic, hemi-isotactic or atactic; where atactic polymers are preferred. Stereo block copolymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyl toluene, all isomers of ethyl styrene, propyl styrene, vinyl biphenyl, vinyl naphthalene, and vinyl anthracene, and mixtures thereof. Homopolymers and copolymers may have a stereo-structure including syndiotactic, isotactic, hemi-isotactic or atactic; where atactic polymers are preferred. Stereo block copolymers are also included;

a) Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhyride, styrene/acrylonitrile/methyl acrylate; mixtures of high impact strength of styrene co-polymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/-ethylene/propylene/styrene.

b) Hydrogenated aromatic polymers derived from hydrogenation of polymers mentioned under 6), especially including polycyclohexylethylene (PCHE) prepared by hydrogenating atactic polystyrene, often referred to as polyvi-nylcyclohexane (PVCH).
 c) Hydrogenated aromatic polymers derived from hydrogenation of polymers mentioned under 6a). Homopolymers and copolymers may have a stereo structure including syndiotactic, isotactic, hemi-isotactic or atactic; where atactic polymers are preferred. Stereo block copolymers are also included.
7. Graft copolymers of vinyl aromatic monomers, such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.
8. Halogen-containing polymers such as polychloroprene, chlorinated rubbers, chlorinated and brominated copolymer of isobutylene-isoprene (halobutyl rubber), chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.
9. Polymers derived from α,β-unsaturated acids and derivatives thereof such as polyacrylates and polymethacrylates; polymethyl methacrylates, polyacrylamides and polyacrylonitriles, impact-modified with butyl acrylate.
10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1 above.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes, which contain ethylene oxide as a comonomer; polyacetals modified with thermoplastic polyurethanes, acrylates or MBS.
14. Polyphenylene oxides and sulphides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and co-polyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic poly-amides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or co-polyamides modified with EPDM or ABS; and polyamides condensed during processing (RIM polyamide systems).
17. Polyureas, polyisocyanurates, polyimides, polyamide imides, polyether imides, polyester imides, polyhydantoins and polybenzimidazoles.
18. Polyesters derived from dicarboxylic acids and diols and/or from hydroxycarboxylic acids or the corresponding lactones, for example polyethylene terephthalate, poly-butylene terephthalate, poly-1,4-dimethylolcyclohexane terephthalate, polyalkylene naphthalate (PAN) and polyhydroxybenzoates, as well as block co-polyether esters derived from hydroxyl-terminated polyethers; and also polyesters modified with polycarbonates or MBS.
19. Polyketones.
20. Polysulphones, polyether sulphones and polyether ketones.
21. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and co-polymers, PA/HDPE, PA/PP, PA/PPO, PBT/thermoplastic polyester elastomers, PBT/PC/ABS or PBT/PET/PC.
22. Polycarbonates are obtainable by interfacial processes or by melt processes (catalytic transesterification). The polycarbonate may be either branched or linear in structure and may include any functional substituents. Polycarbonate copolymers and polycarbonate blends are also within the scope of the invention. The term polycarbonate should be interpreted as inclusive of copolymers and blends with other thermoplastics. Methods for the manufacture of polycarbonates are known, for example, from U.S. Pat. Nos. 3,030,331; 3,169,121; 4,130,458; 4,263,201; 4,286,083; 4,552,704; 5,210,268; and 5,606,007. A combination of two or more polycarbonates of different molecular weights may be used.
 Preferred are polycarbonates obtainable by reaction of a diphenol, such as bisphenol A, with a carbonate source.
 Examples of suitable diphenols are:
Bisphenol A:, bisphenol AF:,
bisphenol AP:, bisphenol B:,
bisphenol C:, bisphenol E:,
bisphenol F:, bisphenol M:,
bisphenol P:,
bisphenol S:, bisphenol TMC:
bisphenol Z:, 4,4'-(2-norbornylidene)bis(2,6-dichlorophenol); or
fluorene-9-bisphenol:
 The carbonate source may be a carbonyl halide, a carbonate ester or a haloformate. Suitable carbonate halides are phosgene or carbonylbromide. Suitable carbonate esters are dialkyl-carbonates, such as dimethyl- or diethylcarbonate, di-phenyl carbonate, phenyl-alkyl-phenyl-carbonate, such as phenyl-tolylcarbonate, dialkylcarbonates, such as di-methyl- or di-ethylcarbonate, di-(halophenyl)carbonates, such as di-(chlorophenyl)-carbonate, di-(bromophenyl)-carbonate, di-(tri-chlorophenyl)carbonate or di-(trichlorophenyl)-carbonate, di-(alkylphenyl)-carbonates, such as di-tolylcarbonate, naphthylcarbonate, di-chloronaphthylcarbonate and others.

The polymer substrate mentioned above, which comprises polycarbonates or polycarbonate blends is a polycarbonate-copolymer, wherein isophthalate/terephthalate-resorcinol segments are present. Such polycarbonates are commercially available, e.g. Lexan® SLX (General Electrics Co. USA). Other polymeric substrates of component b) may additionally contain in the form as admixtures or as copolymers a wide variety of synthetic polymers including polyolefins, polystyrenes, polyesters, polyethers, polyamides, poly(meth)acrylates, thermoplastic polyurethanes, polysulphones, polyacetals and PVC, including suitable compatibilizing agents. For example, the polymer substrate may additionally contain thermoplastic polymers selected from the group of resins consisting of polyolefins, thermoplastic polyurethanes, styrene polymers and copolymers thereof. Specific embodiments include polypropylene (PP), polyethylene (PE), polyamide (PA), polybutylene terephthalate (PBT), polyethylene terephthalate (PET), glycol-modified polycyclohexylenemethylene terephthalate (PCTG), polysulphone (PSU), polymethylmethacrylate (PMMA), thermoplastic polyurethane (TPU), acrylonitrile-butadiene-styrene (ABS), acrylonitrile-styrene-acrylic ester (ASA), acrylonitrile-ethylene-propylene-styrene (AES), styrene-maleic anhydride (SMA) or high impact polystyrene (HIPS).

As component A any suitable thermoplastic polyester can preferably be employed.

Preferred polyesters are semi-crystalline or amorphous and have a viscosity number of 50 to 180 mL/g, more preferably 80 to 150 mL/g, determined in a 0.5 wt.-% solution in phenol/odichlorobenzene (1:1) at 25° C. according to DIN 53728/ISO 307.

Polyesters are polymers which have recurring units containing an ester group in the polymer chain. According to the present invention, polycarbonates and liquid crystalline polyesters are encompassed in this definition of component A.

According to one embodiment of the invention the polyesters are based on dicarboxylic acids and diols.

The dicarboxylic acids employed in the polyesters can be aliphatic or aromatic dicarboxylic acids having 4 to 18 carbon atoms. Preferred dicarboxylic acids are selected from the group consisting of phthalic acid, terephthalic acid, isophthalic acid, naphthalene-1,4-dicarboxylic acid, naphthalene-2,3-dicarboxylic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid and sebacic acid and mixtures thereof. Preferably, the dicarboxylic acids employed in the polyester are selected from terephthalic acid and naphthalene dicarboxylic acid or a mixture thereof.

The diols contained in these polyesters can be cycloaliphatic diols having 6 to 20 carbon atoms or aliphatic diols having 2 to 20 carbon atoms. Preferably, the diol is selected from the group consisting of ethylene glycol, diethylene glycol, triethylene glycol, 1,4-cyclohexane dimethanol, propane-1,3-diol, propane-1,2-diol, butane-1,2-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, hexane-1,3-diol, 2,2-bis(4-hydroxycyclohexyl) propane and 2,4-dihydroxy-1,1,3,3-tetramethylcyclobutane isosorbitol and mixtures thereof.

In a preferred embodiment of the invention the polyester contains ethylene glycol or butane-1,4-diol as diol component.

According to a preferred embodiment of the invention the polyester A is homopolymer of polyethyleneterephthalate (PET), polyethylenenaphthalate (PEN), polybutyleneterephthalate (PBT) or a mixture thereof, most preferred is PBT.

The polyesters can also be derived from aromatic or aliphatic hydroxycarboxylic acids. The aliphatic hydroxycarboxylic acids are typically $C_{1-12}$-carboxylic acids which contain besides a COOH-group at least one OH-group. They can furthermore contain additional functional groups and branching $C_{1-8}$-alkyl chains. Preferred hydroxy carboxylic acids are selected from the group consisting of 2-hydroxy acetic acid, 2-hydroxy propionic acid, 3-hydroxy propionic acid, 4-hydroxybutanoic acid, 5-hydroxy pentanoic acid, 6-hydroxy hexanoic acid, maleic acid, tartaric acid and citric acid. Aromatic hydroxy carboxylic acids contain 7 to 20 carbon atoms and at least one hydroxy functionality. Preferred examples are o-, m- or p-hydroxy benzoic acid.

The preparation of the polyesters A can be performed following known procedures, see for example Encycl. Polym. Sci. Engng. 12, 1 to 313 and Houben-Weyl E 20/2, 1405 to 1420, Ullmann (4.) 19, 61-88.

Further polyesters which can be employed according to the present invention are described in WO 2012/020112 and DE-A-10 2009 011 668. The latter describes highly or hyperbranched polyesters.

It is also advantageous to use recycled PET materials (also termed scrap PET), optionally mixed with polyalkylene terephthalates, such as PBT.

Recyclates are generally:
1) that known as post-industrial recyclate: these materials are production wastes arising during polycondensation or during processing, e.g. sprues from injection molding, start-up material from injection molding or extrusion, or edge trims from extruded sheets or films.
2) post-consumer recyclate: these materials are plastics items which are collected and treated after use by the end consumer. Blow-molded PET bottles for mineral water, soft drinks and juices are easily the predominant items in terms of quantity.

Both types of recyclate may be used either in the form of regrind or in the form of pelletized materials. In the latter case, the crude recyclates are separated and purified and then melted and pelletized using an extruder. This usually facilitates handling and free flow, and metering for further steps in processing.

The recyclates used may either be pelletized or in the form of regrind. The edge length should not be more than 10 mm, preferably less than 8 mm.

Because polyesters undergo hydrolytic cleavage during processing (due to traces of moisture) it is advisable to predry the recyclate. The residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are composed of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula

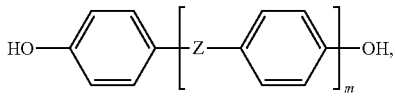

where Z is an alkylene or cycloalkylene group having up to 8 carbon atoms, an arylene group having up to 12 carbon atoms, a carbonyl group, a sulfonyl group, an oxygen atom, or a sulfur atom, or a chemical bond, and where m is from 0 to 2. The phenylene groups of the compounds may also have substitution by $C_1$-$C_6$-alkyl or alkoxy groups, and fluorine, chlorine or bromine.

Examples of parent compounds for these compounds are
dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α-α'-di(hydroxyphenyl)dialkylbenzene,
di(hydroxyphenyl) sulfone, di(hydroxybenzoyl)benzene,
resorcinol, and hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone, and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, polyesters also include halogen-free polycarbonates. Examples of suitable halogen-free polycarbonates are those based on diphenols of the general formula

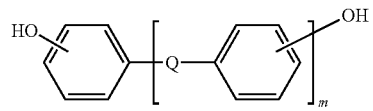

where Q is a single bond, a $C_1$-$C_8$-alkylene group, a $C_2$-$C_3$-alkylidene group, a C3-C6cycloalkylidene group, a $C_6$-$C_{12}$-arylene group, or —O—, —S— or —SO$_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically and preferably by incorporating 0.05 to 2.0 mol %, based on the total of the diphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to average molar masses $M_w$ (weight-average) of from 10 000 to 200 000 g/mol, preferably from 20 000 to 80 000 g/mol.

The diphenols of the general formula are known per se or can be produced by known processes.

The polycarbonates may, for example, be produced by reacting the diphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1, 3-tetramethylbutyl)phenol as in DE-A 28 42 005, or monoalkylphenols, or dialkylphenols with a total of from 8 to 20 carbon atoms in the alkyl substituents as in DE-A 35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates composed of halogen-free diphenols, of halogen-free chain terminators and optionally of halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where during the preparation process phosgene has been replaced by aromatic dicarboxylic acid units, such as isophthalic acid and/or terephthalic acid units. Reference may be made at this point to EP-A 711 810 for further details.

EP-A 365 916 describes other suitable copolycarbonates having cycloalkyl radicals as monomer units.

It is also possible for bisphenol A to be replaced by bisphenol TMC. Polycarbonates of this type are obtainable from Bayer with the trademark APEC HT®.

Polyamides are also preferred thermoplastic polymers A.

The intrinsic viscosity of the polyamides of the inventive molding compositions is generally from 90 to 350 ml/g, preferably from 110 to 240 ml/g, determined in 0.5% strength by weight solution in 96% strength by weight sulfuric acid at 25° C. to ISO 307.

Semicrystalline or amorphous resins whose molecular weight (weight-average) is at least 5000 are preferred, examples being those described in the U.S. Pat. Nos. 2,071, 250, 2,071,251, 2,130,523, 2,130,948, 2,241,322, 2,312,966, 2,512,606, and 3,393,210.

Examples here are polyamides which derive from lactams having from 7 to 13 ring members, for example polycaprolactam, polycaprylolactam, and polylaurolactam, and also polyamides obtained via reaction of dicarboxylic acids with diamines.

Dicarboxylic acids that can be used are alkanedicarboxylic acids having from 6 to 12, in particular from 6 to 10 carbon atoms, and aromatic dicarboxylic acids. Just a few acids that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine, di(4-aminophenyl)methane, di(4aminocyclohexyl)methane, 2,2-di(4-aminophenyl)propane, 2,2-di(4-aminocyclohexyl)propane, or 1,5-diamino-2-methylpentane.

Preferred polyamides are polyhexamethyleneadipamide, polyhexamethylenesebacamide, and polycaprolactam, and also nylon-6/6,6 copolyamides, in particular having from 5 to 95% by weight content of caprolactam units.

Other suitable polyamides are obtainable from ω-aminoalkyl nitriles, such as aminocapronitrile (PA 6) and adiponitrile with hexamethylenediamine (PA 66), by what is known as direct polymerization in the presence of water, as described by way of example in DE-A 10313681, EP-A 1198491, and EP 922065.

Mention may also be made of polyamides obtainable by way of example via condensation of 1,4-diaminobutane with adipic acid at an elevated temperature (nylon-4,6). Preparation processes for polyamides of said structure are described by way of example in EP-A 38 094, EP-A 38 582, and EP-A 39 524.

Other suitable polyamides are those obtainable via copolymerization of two or more of the abovementioned monomers, or a mixture of a plurality of polyamides, in any desired mixing ratio.

Semiaromatic copolyamides, such as PA 6/6T and PA 66/6T, have moreover proven suitable, the triamine content of these being less than 0.5% by weight, preferably less than 0.3% by weight (see EP-A 299 444 and EP-A 667 367).

Suitable copolyamides are composed of:
A1) from 20 to 90% by weight of units which derive from terephthalic acid and hexamethylenediamine,
A2) from 0 to 50% by weight of units which derive from c-caprolactam, and
A3) from 0 to 80% by weight of units which derive from adipic acid and hexamethylenediamine,
A4) from 0 to 40% by weight of further polyamide-forming monomers, where the proportion of component (A2) or (A3) or (A4), or a mixture of these, is at least 10% by weight.

Component A1) comprises 20 to 90% by weight of units, which derive from terephthalic acid and hexamethylenediamine.

Alongside the units which derive from terephthalic acid and hexamethylenediamine, the copolyamides comprise, if appropriate, units which derive from c-caprolactam, and/or units which derive from adipic acid and hexamethylenediamine, and/or units which derive from further polyimide-forming monomers.

Aromatic dicarboxylic acids A4) have from 8 to 16 carbon atoms. Examples of suitable aromatic dicarboxylic acids are isophthalic acid, substituted terephthalic and isophthalic acids, e.g. 3-tertbutylisophthalic acid, polynuclear dicarboxylic acids, e.g. 4,4'- and 3,3'-diphenyldicarboxylic acid, 4,4'- and 3,3'-diphenylmethanedicarboxylic acid, 4,4'- and 3,3'-diphenyl sulfone dicarboxylic acid, 1,4- or 2,6-naphthalenedicarboxylic acid, or phenoxyterephthalic acid, particular preference being given here to isophthalic acid.

Further polyamide-forming monomers A4) can derive from dicarboxylic acids having from 4 to 16 carbon atoms and from aliphatic or cycloaliphatic diamines having from 4 to 16 carbon atoms, or else from aminocarboxylic acids and, respectively, corresponding lactams having from 7 to 12 carbon atoms. Mention may be made of just a few suitable monomers of these types: suberic acid, azelaic acid, or sebacic acid as representatives of the aliphatic dicarboxylic acids, 1,4-butanediamine, 1,5-pentanediamine, piperazine, 4,4'-diaminodicyclohexylmethane, 2,2-(4,4'-diaminodicyclohexyl)propane, 3,3'-dimethyl-4,4'-diaminodicyclohexylmethane or metaxylylenediamine as representatives of the diamines, and caprylolactam, enanthlactam, ω-aminoundecanoic acid and laurolactam as representatives of lactams and, respectively, aminocarboxylic acids.

Polyamides of that kind are disclosed in DE-A-10 2009 011 668.

The following list, which is not comprehensive, comprises the polyamides A) mentioned and other polyamides for the purposes of the invention, and the monomers comprised.

AB polymers:
PA 4 Pyrrolidone
PA 6 ε-Caprolactam
PA 7 Ethanolactam
PA 8 Caprylolactam
PA 9 9-Aminopelargonic acid
PA 11 11-Aminoundecanoic acid
PA 12 Laurolactam
AA/BB polymers:
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA MXD6 m-Xylylenediamine, adipic acid
AA/BB polymers
PA 6I Hexamethylenediamine, isophthalic acid PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 Diaminodicyclohexylmethane, laurolactam
PA 6I/6T/PACMT as PA 6I/6T+diaminodicyclohexylmethane, terephthalic acid
PA 6T/6I/MACMT as PA 6I/6T+dimethyldiaminocyclohexylmethane, terephthalic acid
PA 6T/6I/MXDT as PA 6I/6T+m-xylylenediamine, terephthalic acid
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid.

Component B

An essential component of the flame retardant thermoplastic polyester molding compositions according to the present invention are the thermoplastic polyesters containing eBHDB-units as component B.

These polyesters can contain any polyester forming monomeric units besides the eBHDB-units. Typically they contain at least one dicarboxylic acid unit and optionally further diol or polyol units or mixtures thereof.

Reference can be made to the above polyester component A for which different building blocks or monomeric units are described. The amount of the eBHDB monomeric units in the diol component of the polyester component B can be in the range of from 0.01 to 1 equivalent, preferably 0.1 to 0.95 equivalents, more preferably 0.2 to 0.75 equivalents, based on one equivalent of diol units in total and one equivalent of dicarboxylic acid units in total.

Preferably, component B is a polyester based on at least one aromatic dicarboxylic acid, eBHDB and optionally at least one further diol or polyol (e.g. glycerine) or mixtures thereof, preferably aliphatic $C_{2-12}$-diol as monomers. The aromatic dicarboxylic acid is preferably terephthalic acid.

The at least one further diol is preferably an aliphatic $C_{3-6}$-diol, more preferably butanediol. The optimum ratio of eBHDB to butanediol is in the range of from 0.2:0.8 to 0.75:0.25 on a molar basis.

For example, based on one equivalent of terephthalic acid, 0.5 equivalents eBHDB and 0.5 equivalents butanediol can be employed.

Component B can be prepared as described in U.S. Pat. No. 8,314,202 B2 by performing a polycondensation of the respective monomers. It is also possible to perform a transesterification to arrive at component B, for example starting from dialkylterephthalate. Furthermore, acid halides and activated diol components can be employed for preparing component B.

Component B preferably has a molecular weight (Mn) in the range of from 3000 to 15000, more preferably of 5000 to 11000.

The viscosity number of component B is preferably in the range of from 20 to 160, more preferably 30 to 110 mL/g, determined in a 0.5 wt.-% solution in phenol/o-dichlorobenzene (1:1) at 25° C. according to DIN 53728/ISO 307.

Component C

Component C is at least one flame retardant additive, selected from phosphorus containing flame retardant additives, preferably metal salts of a phosphinic acid and halogen containing flame retardant additives.

Flame retardant C) can be elemental red phosphorus, in particular in combination with glassfiber-reinforced molding compositions; it can be used in untreated form.

However, particularly suitable preparations are those in which the phosphorus has been surface-coated with low-molecular-weight liquid substances, such as silicone oil, paraffin oil, or esters of phthalic acid (in particular dioctyl phthalate, see EP 176 836) or adipic acid, or with polymeric or oligomeric compounds, e.g. with phenolic resins or amino plastics, or else with polyurethanes (see EP-A 384 232, DE-A 196 48 503). The amounts comprised of these "phlegmatizing agents" are generally from 0.05 to 5% by weight, based on 100% by weight of B).

Concentrates of red phosphorus, e.g. in a polyamide or elastomer, are moreover suitable as flame retardants. In particular, polyolefin homo- and copolymers are suitable as concentrate polymers. However, unless polyamide is used as thermoplastic, the proportion of the concentrate polymer should not amount to more than 35% by weight, based on the total weight of the molding compositions of the invention.

Preferred phosphorus concentrate compositions are $C_1$) from 30 to 90% by weight, preferably from 45 to 70% by weight, of a polyamide or elastomer, and $C_2$) from 10 to 70% by weight, preferably from 30 to 55% by weight, of red phosphorus.

The polyamide used for the masterbatch can differ from A) or preferably can be the same as A), in order to avoid any incompatibility or melting point difference having an adverse effect on the molding composition.

In another process for incorporating the additives B) of the invention, the red phosphorus is suspended in an aqueous solution or suspension of the appropriate additive. This is followed by filtering, washing with water, and drying of the phosphorus thus obtained and surface-wetted with the respective additive B), and drying under inert gas. The modified phosphorus can then be incorporated into thermoplastic molding compositions by using suitable processing machines.

The average particle size ($d_{50}$) of the phosphorus particles dispersed in the molding compositions is preferably in the range from 0.0001 to 0.5 mm; in particular from 0.001 to 0.2 mm.

A suitable component C) is phosphinic salts of the formula (I) or/and diphosphinic salts of the formula (II), or polymers of these

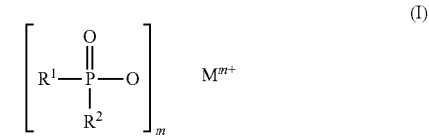

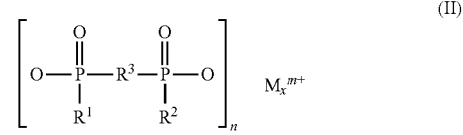

in which $R^1$ and $R^2$ are identical or different and are hydrogen, $C_1$-$C_6$-alkyl, linear or branched, and/or aryl;

$R^3$ is $C_1$-$C_{10}$-alkylene, linear or branched, $C_6$-$C_{10}$-arylene, -alkylarylene, or -arylalkylene;

M is Mg, Ca, Al, Sb, Sn, Ge, Ti, Zn, Fe, Zr, Ce, Bi, Sr, Mn, Li, Na, K, and/or a protonated nitrogen base;

m is from 1 to 4; n is from 1 to 4; x is from 1 to 4, preferably m=3, x=3.

It is preferable that $R^1$ and $R^2$ of component B are identical or different and are hydrogen, methyl, ethyl, n-propyl, isopropyl, n-butyl, tert-butyl, n-pentyl and/or phenyl.

It is preferable that $R^3$ of component B is methylene, ethylene, n-propylene, isopropylene, n-butylene, tert-butylene, n-pentylene, n-octylene, or n-dodecylene, phenylene, or naphthylene; methylphenylene, ethylphenylene, tert-butylphenylene, methylnaphthylene, ethylnaphthylene, or tert-butylnaphthylene; phenylmethylene, phenylethylene, phenylpropylene or phenylbutylene.

It is particularly preferable that $R^1$ and $R^2$ are hydrogen, methyl or ethyl, and that M=Al, particular preference being given to Al hypophosphite.

The phosphinates are preferably produced via precipitation of the corresponding metal salts from aqueous solutions. However, it is also possible to precipitate the phosphinates in the presence of a suitable inorganic metal oxide or metal sulfide as carrier material (white pigments, examples being $TiO_2$, $SnO_2$, ZnO, ZnS, $SiO_2$). This method gives surface-modified pigments which can be used as laser-markable flame retardants for thermoplastic polyesters.

Preferred metal salts of a phosphinic acid can be derived from Mg, Ca, Al, Zn, Ti, Fe as cation or melamine, melame, imidazole or guanidine groups. The phosphinic acid can be unsubstituted or substituted by one or two hydrocarbon groups, preferably phenyl, methyl, ethyl, propyl, isobutyl, iso-octyl, or R'CH—OH with R' being hydrogen, phenyl or tolyl.

Alternatively, a metal salt of hypophosphoric acid with Mg, Ca, Al or Zn as metal can be employed.

For a further discussion of this component C, reference can be made DE-A-44 30 932 and DEA-199 33 901.

Preferably, component C is an aluminum salt of phosphinic acid or di-$C_{1-6}$-alkyl phosphinic acid, more preferably aluminum hypophosphite or aluminum diethylphosphinate.

Alternatively or additionally, component C can be a halogen containing flame retardant additive.

Suitable flame retardants are preferably brominated compounds such as, brominated diphenyl ethers, brominated trimethylphenylindanes (FR 1808 from DSB), tetrabromobisphenol A, and hexabromocyclododecane.

Suitable flame retardants are preferably brominated compounds such as brominated oligocarbonates (BC 52 or BC 58 from Great Lakes) of the following structural formula:

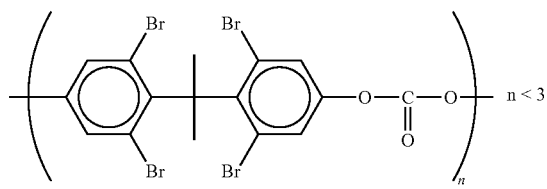

Particularly suitable compounds are polypentabromobenzyl acrylates where n>4 (e.g. FR 1025 from ICL-IP) of the formula:

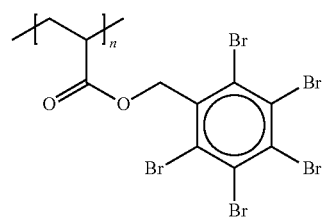

Other preferred brominated compounds are oligomeric reaction products (n>3) of tetrabromobisphenol A with epoxides (e.g. FR 2300 and 2400 from DSB) of the formula:

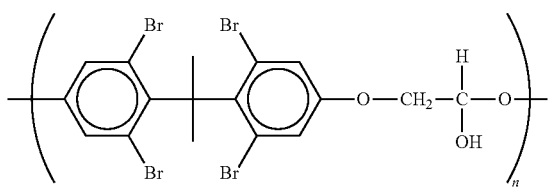

The brominated oligostyrenes preferably used as flame retardants have an average degree of polymerization (number average) of from 3 to 90, preferably from 5 to 60, measured by vapor pressure osmometry in toluene. Cyclic oligomers are equally suitable. According to one preferred embodiment of the invention, the brominated oligomeric styrenes to be used have the formula I below, in which R is hydrogen or an aliphatic moiety, in particular an alkyl moiety, such as, for example, $CH_2$ or $C_2H_5$ and n is the number of the repeating chain units. R' can be either H or else bromine or else a fragment of a conventional free-radical generator:

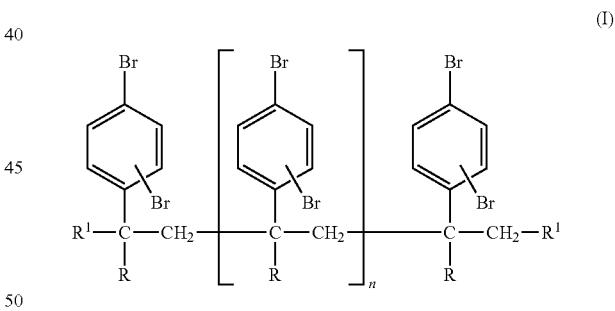

The value n can be from 1 to 88, preferably from 3 to 58. The brominated oligostyrenes comprise from 40 to 80% by weight, preferably from 55 to 70% by weight of bromine. Preference is given to a product composed mainly of polydibromostyrene. The substances can be melted without decomposition and are by way of example soluble in tetrahydrofuran. They can be produced either by ring bromination of—optionally aliphatically hydrogenated—styrene oligomers of the type that are obtained by way of example by thermal polymerization of styrene (according to DT-OS 25 37 385) or by free-radical oligomerization of suitable brominated styrenes. The flame retardant can also be produced by ionic oligomerization of styrene and subsequent bromination. The amount of brominated oligostyrene needed to provide flame retardancy to the polyamides depends on the bromine content. The bromine content in the molding compositions of the invention is from 2 to 30% by weight, preferably from 5 to 12% by weight.

The brominated polystyrenes of the invention are usually obtained by the process described in EP-A 47 549:

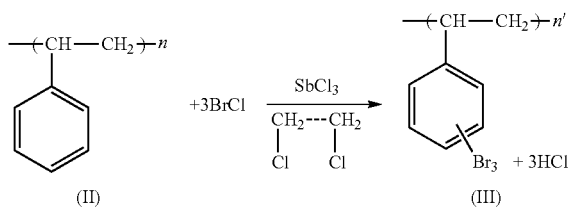

(II)          (III)

The brominated polystyrenes obtainable by said process and commercially are mainly ring-substituted tribrominated products. n' (see III) generally has values of from 125 to 1 500, corresponding to a molecular weight of from 42 500 to 235 000, preferably from 130 000 to 135 000.

Bromine content (based on the content of ring-substituted bromine) is generally at least 50% by weight, preferably at least 60% by weight and in particular 65% by weight.

The pulverulent products obtainable commercially generally have a glass transition temperature of from 160 to 200° C. and are obtainable by way of example as HP 7010 from Albemarle and Pyrocheck PB 68 from Ferro Corporation.

It is also possible to use mixtures of the brominated oligostyrenes with brominated polystyrenes in the molding compositions of the invention where the mixing ratio is as desired.

Chlorine-containing flame retardants are also suitable, preference being given here to Declorane plus from Oxychem.

Flame retardant additives are preferably selected from the group consisting of core brominated polystyrene, brominated polybenzylacrylates, brominated bisphenol-A-epoxide oligomers, brominated bisphenol-A-polycarbonates. Preferably, this component C is a brominated polystyrene, brominated polybenzylacrylate or brominated bisphenol-A-containing polymer.

Pentabrombenzylacrylate and antimony trioxide are for example described in EP-A-0 624 626.

A combination of aluminum diethylphosphinate (DEPAL) with melamine polyphosphate is described in DE-A-199 33 901.

Component D

Component D is at least one flame retardant synergist which is different from component C and is selected from nitrogen compounds, preferably melamine compounds and metal oxides and metal borates or metal stannates. Melamine compounds can be the known melamine flame retardant synergists. Preferred melamine compounds are melamine borate, melamine phosphate, melamine sulfate, melamine pyrophosphate, melamine polyphosphate, melame, meleme, melone and melamine cyanurate.

Melamine cyanurate is preferably suitable in the invention and is a reaction product of preferably equimolar amounts of melamine (formula I) and cyanuric acid or isocyanuric acid (formulae Ia and Ib)

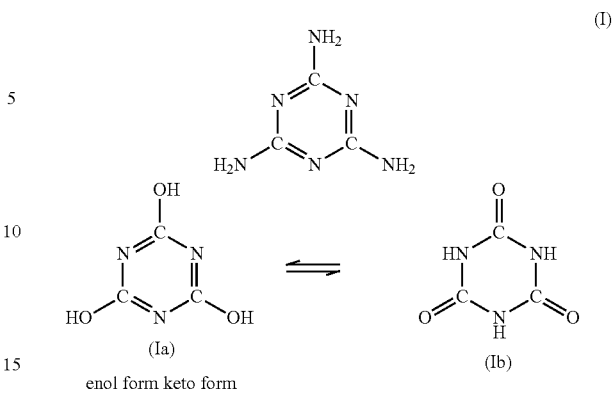

(Ia) enol form     (Ib) keto form

It is obtained by way of example via reaction of aqueous solutions of the starting compounds at from 90 to 100° C. The commercially available product is a white powder of average $d_{50}$ grain size from 1.5 to 7 µm having a $d_{99}$ value smaller than 50 µm.

Other suitable compounds (often also termed salts or adducts) are melamine sulfate, melamine, melamine borate, melamine oxalate, melamine phosphate prim., melamine phosphate sec. and melamine pyrophosphate sec., melamine neopentyl glycol borate, and also polymeric melamine phosphate (CAS No 56386-64-2 or 218768-84-4).

Preference is given to melamine polyphosphate salts derived from a 1,3,5-triazine compound of which the number n representing the average degree of condensation is from 20 to 200, and the 1,3,5-triazine content per mole of phosphorus atom is from 1.1 to 2.0 mol of a 1,3,5-triazine compound selected from the group consisting of melamine, melam, melem, melon, ammeline, ammelide, 2-ureidomelamine, acetoguanamine, benzoguanamine, and diaminophenyltriazine. It is preferable that then value of these salts is generally from 40 to 150, and that the molar ratio of a 1,3,5-triazine compound to phosphorus atom is from 1.2 to 1.8. The pH of a 10% by weight aqueous slurry of salts produced as in EP-B1095030 is moreover generally more than 4.5 and preferably at least 5.0. The pH is usually determined by placing 25 g of the salt and 225 g of pure water at 25° C. in a 300 ml beaker, stirring the resultant aqueous slurry for 30 minutes, and then measuring the pH. The abovementioned n value, the number-average degree of condensation, can be determined by means of $^{31}P$ solid-state NMR. J. R. van Wazer, C. F. Callis, J. Shoolery and R. Jones, J. Am. Chem. Soc., 78, 5715, 1956 disclose that the number of adjacent phosphate groups is given by a unique chemical shift which permits clear distinction between orthophosphates, pyrophosphates, and polyphosphates. EP1095030B1 moreover describes a process for producing the desired polyphosphate salt of a 1,3,5-triazine compound which has an n value of from 20 to 200, where the 1,3,5-triazine content of said 1,3,5-triazine compound is from 1.1 to 2.0 mol of a 1,3,5-triazine compound. Said process comprises conversion of a 1,3,5-triazine compound into its orthophosphate salt by orthophosphoric acid, followed by dehydration and heat treatment in order to convert the orthophosphate salt into a polyphosphate of the 1,3,5-triazine compound. Said heat treatment is preferably carried out at a temperature of at least 300° C., and preferably at least 310° C. In addition to orthophosphates of 1,3,5-triazine compounds, it is equally possible to use other 1,3,5-triazine phosphates, inclusive of, for example, a mixture of orthophosphates and of pyrophosphates.

Suitable guanidine salts are

|  | CAS No. |
| --- | --- |
| G carbonate | 593-85-1 |
| G cyanurate prim. | 70285-19-7 |
| G phosphate prim. | 5423-22-3 |
| G phosphate sec. | 5423-23-4 |
| G sulfate prim. | 646-34-4 |
| G sulfate sec. | 594-14-9 |
| Guanidine pentaerythritol borate | N.A. |
| Guanidine neopentyl glycol borate | N.A. |
| and also urea phosphate green | 4861-19-2 |
| Urea cyanurate | 57517-11-0 |
| Ammeline | 645-92-1 |
| Ammelide | 645-93-2 |
| Melem | 1502-47-2 |
| Melon | 32518-77-7 |

Compounds for the purposes of the present invention are intended to be not only by way of example benzoguanamine itself and its adducts or salts but also the derivatives substituted on nitrogen and their adducts or salts.

Other suitable compounds are ammonium polyphosphate $(NH_4PO_3)_n$, where n is about 200 to 1000, preferably from 600 to 800, and tris(hydroxyethyl) isocyanurate (THEIC) of the formula IV

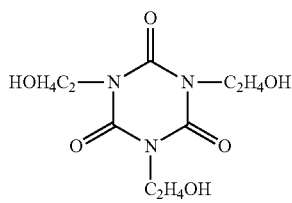

(IV)

or its reaction products with aromatic carboxylic acids $Ar(COOH)_m$, optionally in mixtures with one another, where Ar is a mono-, bi-, or trinuclear aromatic six-membered ring system, and m is 2, 3, or 4.

Examples of suitable carboxylic acids are phthalic acid, isophthalic acid, terephthalic acid, 1,3,5-benzenetricarboxylic acid, 1,2,4-benzenetricarboxylic acid, pyromellitic acid, mellophanic acid, prehnitic acid, 1-naphthoic acid, 2-naphthoic acid, naphthalenedicarboxylic acids, and anthracenecarboxylic acids.

They are produced by reacting the tris(hydroxyethyl) isocyanurate with the acids, or with their alkyl esters or their halides in accordance with the processes in EP-A 584 567.

Reaction products of this type are a mixture of monomeric and oligomeric esters which may also have crosslinking. The degree of oligomerization is usually from 2 to about 100, preferably from 2 to 20. Preference is given to the use of THEIC and/or its reaction products in mixtures with phosphorus-containing nitrogen compounds, in particular $(NH_4PO_3)_n$ or melamine pyrophosphate or polymeric melamine phosphate. The mixing ratio, for example of $(NH_4PO_3)_n$ to THEIC, is preferably 90-50:10-50% by weight, in particular 80-50:50-20% by weight, based on the mixture of components B1) of this type.

Other suitable compounds are benzoguanamine compounds of the formula V

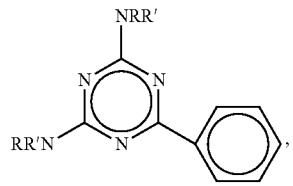

(V)

where R and R' are straight-chain or branched alkyl radicals having from 1 to 10 carbon atoms, preferably hydrogen and in particular their adducts with phosphoric acid, boric acid and/or pyrophosphoric acid.

Preference is also given to allantoin compounds of the formula VI

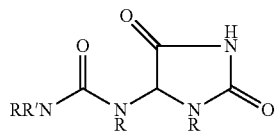

(VI)

where R and R' are as defined in formula V, and also to the salts of these with phosphoric acid, boric acid and/or pyrophosphoric acid, and also to glycolurils of the formula VII and to their salts with the above mentioned acids

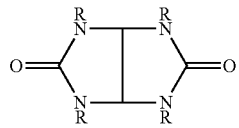

(VII)

where R is as defined in formula V.

Suitable products are obtainable commercially or in accordance with DE-A 196 14 424.

The cyanoguanidine (formula VIII) which can be used according to the invention is obtained, for example, by reacting calcium cyanamide with carbonic acid, whereupon the cyanamide produced dimerizes at a pH of from 9 to 10 to give cyanoguanidine.

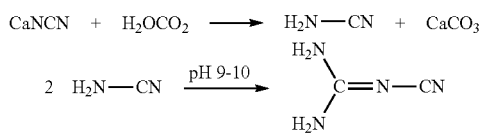

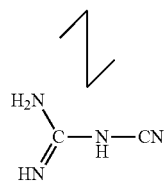

(VIII)

The product obtainable commercially is a white powder with a melting point of from 209° C. to 211° C.

It is very particularly preferable in the invention to use melamine cyanurate having the following particle size distribution:

$d_{98}$<25 μm, preferably <20 μm
$d_{50}$<4.5 μm, preferably <3 μm.

The person skilled in the art generally understands a $d_{50}$ value to be the particle size value which is smaller than that of 50% of the particles and larger than that of 50% of the particles.

The particle size distribution is usually determined via laser scattering (by analogy with ISO 13320).

Specifically preferred is melamine cyanurate, for example obtainable from BASF SE as Melapur® MC25 which is a reaction product of preferably equimolar amounts of melamine and cyanuric acid or isocyanuric acid. It can be obtained by reacting aqueous solutions of these compounds at 90 to 100° C. The product commercially available is a white powder having an average particle diameter $d_{50}$ of 1.5 to 7 μm and a $d_{99}$ lower than 50 μm.

An also preferred component D is melamine polyphosphate which can be obtained from BASF SE as Melapur® M200.

Metal oxides can be selected from all suitable flame retardant synergist metal oxides, for example oxides of Fe, Ti, Sb, Zn, V, Cu, Al, Zr, Mg, Bi. Examples are antimony trioxide, antimony pentoxide or sodium antimonite.

Metal borates and stannates can be based on the same metals.

Component E

As component E glass fibers are employed. Suitable glass fibers can be coated or non-coated. They can be employed in all suitable lengths and diameters.

Component F

As component F at least one further additive can be employed. These additional additives and processing aids can be selected from mineral fillers, like talcum, magnesium hydroxide, wollastonit needles, impact modifying polymers like maleic anhydride functionalized ethylene-acrylate copolymers, polymers with high char yields like polyacrylonitriles, highly aromatic polyamines, polycarbonates and liquid crystalline polyesters, polyphenyleneoxides, lubricants like ester wax and oxidized polyethylene wax, stabilizers including antioxidants, light stabilizers, phenols, phosphites and phosphonites as well as acid scavengers, nucleating agents, carbon black and pigments like $TiO_2$ in rutile or anatase form, ZnO, $ZrO_2$, $SnO_2$, ZnS.

The amount of component A in the molding compositions is 0 to 99.8 wt.-%. If present, the range is from 0.1 to 99.8 wt.-%. A preferred amount is 0.1 to 80 wt.-%, in particular 30 to 60 wt.-%.

The amount of component B is 0.1 to 99.9 wt.-%, preferably 5 to 50 wt.-%, in particular 10 to 25 wt.-%.

The amount of component C is 0.1 to 50 wt.-%, preferably 1 to 35 wt.-%, in particular 5 to 20 wt.-%.

The amount of component D is 0 to 25 wt.-%, preferably 0 to 15 wt.-%, in particular 0 to 8 wt.-%. If present, the amount is 0.1 to 25 wt.-%, preferably 1 to 15 wt.-%, in particular 2 to 8 wt.-%.

The amount of component E is 0 to 60 wt.-%, if present 1 to 60 wt.-%. The preferred amount is 10 to 50 wt.-%, in particular 20 to 30 wt.-%.

The amount of component F is 0 to 30 wt.-%, preferably 0 to 20 wt.-%, in particular 0 to 15 wt. %.

The sum of components A to F (total amount) is 100 wt.-%. If one of these components is not present in the molding compositions, the sum of the components present in the molding composition adds up to a total amount of 100 wt.-%.

The flame retardant thermoplastic polyester molding compositions according to the present invention can be prepared by known processes by mixing the components in known mixing equipment and preferably subsequently extruding it. Useful equipment is described in Handbuch der Kunststoffextrusion, Vol. 1, Grundlagen, Editors F. Hensen, W. Knappe, H. Potente, 1989, pages 3 to 7 (ISBN: 3-446-14339-4) and Vol. 2, Extrusionsanlagen 1986 (ISBN: 3-446 14329-7).

After extrusion the extrudate can be cooled and reduced in particle size. It is also possible to premix two or more single components and add the remaining components in a single or premixed form. Components can also be employed in a carrier polymer in form of a master batch. The mixing temperature is typically in the range of from 230 to 320° C.

The molding composition is employed according to present invention for forming a molding, fiber or a foil.

The invention is further illustrated by the following examples:

EXAMPLES

Starting Materials
Polyamide 6—Ultramid® B24 of BASF SE
Polybutyleneterephthalate having a VZ of 120 cm3/g—Ultradur® B4500 of BASF SE
Glass fiber—"PPG 3786"
Glass fiber—"D1110"
Red phosphorus, Italmatch Chemicals
Aluminumdiethylphosphinate (DEPAL)—Exolit® OP 1240 of Clariant AG
Aluminumhypophosphite CAS: 7784-22-7
Melamine polyphosphate—Melapur® M200 of BASF SE
Melamine cyanurate—Melapur® MC25 of BASF SE
Poly(pentabrombenzylacrylate) (PBBA)
Zinkborate (ZnB)
eBHDB, CAS 1190418-40-6 was prepared according to the disclosures in US2013/0102754

Compounding was performed on an DSM Xplore 15 micro-compounder. The extruder was operated with a temperature of 260° C. and a twin screw-speed of 80 $min^{-1}$. The residence time for the polymers in the extruder was 3 min. For forming moldings, the polymer melt was fed to the injections molding machine Xplore micro-injection molding machine 10 cc. A mold temperature of 60° C. was employed. The injection molding was performed in three stages at 16 bar for 5 s, 16 bar for 5 s and 16 bar for 4 s. Shoulder sticks according to ISO527-2/1BA/2 were obtained in three stages at 14 bar for 5 s, 14 bar for 5 s and 14 bar for 4 s.

The flame retardancy of the molding materials was determined by method UL94-V (Underwriters Laboratories Inc. Standard of Safety, "Test for Flammability of Plastic Materials for Parts in Devices and Appliances", pages 14 to 18, Northbrook 1998.

Thermogravimetric analysis was conducted in a nitrogen atmosphere on a TA Instruments Q50001R using a heating rate of 10° C./min. Char yields were determined by TGA from the mass of the residue remaining at the indicated temperatures.

Example 1

Polycondensation of terephthalic acid with 1,2-bis[4-(2-hydroxyethoxy)phenyl]ethanone (eBHDB) and butanediol to form poly(eBHDB-BD-terephthalate).

Transesterification of dimethylterephthalate 60.58 g (50 mol-%), 1,4-butanediol 19.68 g (35 mol-%), eBHDB 49.99 g (25 mol-%) and tetrabutylortotitanate 0.07 g was performed under nitrogen at 180 to 200° C. for 70 min.

Subsequently, methanol was distilled off. The temperature of this intermediate product was increased to 240° C. in a stepwise manner and reduced pressure of 1 mbar was applied for 50 min. to obtain higher molecular weights upon polycondensation. The polymer had a molecular weight $M_w$ of 53,200 g/mol (determined by SEC).

Example 2

Polycondensation of terephthalic acid with 1.2-bis[4-(2-hydroxyethoxy)phenyl]ethanone (eBHDB) to give poly (eBHDB-terephthalate) and ethylene glycol.

The transesterification of dimethylterephthalate 30.29 g (50 mol-%), ethylene glycol 1.94 g (10 mol-%), eBHDB 49.99 g (50 mol-%) and tetrabutylorthotitanate 0.05 g was performed under nitrogen at 180 to 200° C. for min. Subsequently, methanol and ethylene glycol were distilled off. The temperature of this intermediate product was increased to 240° C. in a stepwise manner and reduced pressure of 1 mbar supplied for 50 min. in order to achieve higher molecular weights. The polymer obtained had a molecular weight $M_w$ of 14,200 g/mol, determined by SEC.

It was shown by NMR that a ratio of terephthalic acid: ethylene glycol:deoxybenzoin of 1:2:1 was achieved, corresponding to the polyester formed by terephthalic acid and eBHDB.

Example 3

The procedure of example 1 was followed using different ratios of the educts in order to obtain a series of copolymers with various ratios of butylene versus eBHDB in the polyester structure. Table A lists the ratios obtained, with the respective molecular masses, glass transition temperatures and residue after thermal decomposition.

Table A shows that higher molecular masses can be achieved through addition of butane diol (BDO) as a second diol component as compared to Example 2.

Further, FIG. 1 shows that the char yield of the polyesters formed with eBHDB and BDO is higher than the expected values. The latter can be calculated by applying the sum rule using the mass fractions of eBHDB and BDO with the char yield of PBT as the lower limit and the char yield of the polymer of example 1 as the upper limit. This is surprising, given the fact that PBT-type polyesters are generally known to have a very low char yield due to the use of BDO. The increased amount of char observed for the eBHDB and BD containing polyesters is believed to result from the improved polymerization of eBHDB in the presence of BD.

FIG. 1 shows the residual mass (on the y axis) of the polymers listed in Table A, as determined by TGA at a temperature of 650° C. using a heating rate of 10° C./min. Squares denote the measured char yield, circles the sum rule.

Example 4

The compositions according to the following table 1 were prepared and the flame retardancy was established.

Compositions and determination according to UL94 at 1.6 mm for two samples

TABLE 1

| Example | C 4.1 | 4.2 | 4.3 |
|---|---|---|---|
| Ultradur B4500 | 64.5 | 44.5 | 44.5 |
| Glass fiber PPG 3786 | 25 | 25 | 25 |
| poly(eBHDB-BD-terephthalate) - Ex. 1 | 0 | 20 | |
| poly(eBHDB-terephthalate) - Ex. 2 | | | 20 |
| C1 DEPAL | 8 | 8 | 8 |
| D1 Melapur M200 | 2.5 | 2.5 | 2.5 |
| Ranking | V-2 | V-0 | V-0 |
| burning t1 + t2 [s] | 20 | 6 | 6 |
| Floor wadding inflamed | yes | no | no |
| residue [%, TGA N2, 10° C./min to 600° C.] | 27.7 | 38.2 | 43.2 |

Table 1 shows that by adding 20 wt.-% of component B the burning times are significantly reduced and a better flame retardant ranking according to UL94 could be achieved. Furthermore, the residue formed in the TGA experiment is increased by approximately 11%.

Example 5

The compositions according to table 2 were prepared and analyzed according to UL94 at 1.6 mm for two samples.

TABLE 2

| Example | C 5.1 | 5.2 | C5.3 | 5.4 |
|---|---|---|---|---|
| Ultradur B4500 | 58.1 | 36.1 | 55.6 | 35.6 |
| Glass fiber PPG 3786 | 25 | 25 | 25 | 25 |
| poly(eBHDB-terephthalate) - Ex. 2 | 0 | 20 | 0 | 20 |
| C2 PBBA | 16.9 | 16.9 | 16.9 | 16.9 |
| D1 Melapur M200 | | | 2.5 | 2.5 |
| ZnB | | 2 | | |
| Ranking | V-2 | V-0 | V2 | V0 |
| burning t1 + t2 [s] | 25 | 6 | 18 | 2 |
| Floor wadding inflamed | yes | no | yes | no |

TABLE A

| Example | Experimental composition [molar ratio vs. dimethylterephthalate] (1H-NMR)[1] | eBHDB [% w/w] (NMR) | $M_W$(SEC)[2] | Tg[3] | Residual mass (TGA, N2, 650° C.) | Residual mass (TGA, N2, 850° C.) |
|---|---|---|---|---|---|---|
| 3.1 | 0.9 BDO:0.08 eBHDB | 10% | 42700 | 50 | 11.48 | |
| 3.2 | 0.8 BDO:0.18 eBHDB | 20% | 52300 | 53 | 16.55 | |
| 3.3 | 0.7 BDO:0.28 eBHDB | 28% | 71000 | 56 | 21.26 | |
| 3.4 | 0.6 BDO:0.37 eBHDB | 35% | 78900 | 61 | 26.34 | |
| 1 | 0.5 BDO:0.5 eBHDB | 42% | 53200 | 66 | 30.24 | |
| 3.6 | 0.25 BDO:0.73 eBHDB | 56% | 88000 | 74 | 33.43 | |
| 2 | 0 BDO:1.0 eBHDB | 68% | 14200 | 75 | 35.48 | 30.9 |

$^1$H-NMRs are measured at 400 Hz with trimethylsilane as standard. Example 1 and 2 were dissolved in deuterated chloroform, all other examples were dissolved in hexafluoro-2-propanol.
[2]Analysis of the molecular mass was conducted by SEC. The chromatography was carried out with three columns (HFIP-LG Guard and 2x PL HFIPGel) at 40° C. with a flow of 1 ml/min of the eluent hexafluoro-2-propanol (+0.05% potassium trifluoro acetate). PMMA standards (by PSS) with a molecular weight of M = 800-1,820,000 g/mol were used for calibration. The samples were solved in the eluent (1.5 mg/ml) and filtrated via Millipore Millex FG (0.2 μm).
[3]The glass transition temperature (Tg) was determined by differential scanning calorimetry (DSC). DSC was conducted using a TA Instruments Q2000 using sample amounts between 8 mg and 10 mg. A heating rate of 20° C./min was used to initially heat the sample to 280° C. Tg was determined upon cooling of the melt with a rate of 20° C./min.

In these examples the component B of example 2 was employed. Despite the lack of butanediol units, the polymers could be mixed with PBT via extrusion, and homogeneous samples were obtained. According to the high eBHDB amount, the carbon formation was very efficient.

Example 6

The compositions according to following table 3 formed and tested according to UL94 at 1.6 mm for two samples.

TABLE 3

| Example | C 6.1 | 6.2 |
|---|---|---|
| Ultradur B4500 | 57 | 37 |
| Glass fiber PPG 3786 | 25 | 25 |
| C1 AlHP | 11.4 | 11.4 |
| D1 Melapur MC25 | 6.6 | 6.6 |
| poly(eBHDB-BD-terephthalate) - Ex. 1 | | 20 |
| ranking | V2 | V0 |
| burning t1 + t2 [s] | 11 | 8 |
| Floor wadding inflamed | yes | no |
| residue [%, TGA N2, 10° C./min to 600° C.] | | 40.3 |

Example 7

Tensile test according to ISO527-2/1BA/2 (5 samples)

TABLE 4

| Example | C 7.1 | 7.2 |
|---|---|---|
| Ultradur B4500 | 75 | 55 |
| Glass fiber PPG 3786 | 25 | 25 |
| poly(eBHDB-BD-terephthalate) - Ex. 1 | 0 | 20 |
| E-module (E-t) [Mpa] | 7808 | 6989 |
| maximum stress ($\delta$_M) [Mpa] | 104.7 | 100.3 |
| break stress ($\delta$_B) [Mpa] | 103.2 | 98.3 |
| elongation at break ($\epsilon$_B) [%] | 3.7 | 3.6 |

Table 4 shows that the mechanical properties are not significantly impaired by adding poly(eBHDB-BD-terephthalate).

TABLE 5

| Example | C 7.3 | 7.4 |
|---|---|---|
| Ultradur B4500 | 75 | 55 |
| Glass fiber PPG 3786 | 25 | 25 |
| poly(eBHDB-terephthalate) - Ex. 2 | 0 | 20 |
| E-module (E-t) [Mpa] | 7845 | 8833 |
| maximum stress ($\delta$_M) [Mpa] | 106.4 | 113 |
| break stress ($\delta$_B) [Mpa] | 105.1 | 113 |
| elongation at break ($\epsilon$_B) [%] | 3.3 | 2.1 |

The mechanical data show that the mixture according to the invention has a higher stiffness and a higher maximum stress when poly(eBHDB-terephthalate) is added, whereas elongation at break is reduced in comparison to poly(eBHDB-BD-terephthalate).

Example 8

| Example | C8.1 | C8.2 | C8.3 |
|---|---|---|---|
| poly(eBHDB-BD-terephthalate) - Ex. 3.3 | 64.5 | 0 | 0 |
| poly(eBHDB-BD-terephthalate) - Ex. 1 | 0 | 69.0 | 0 |

-continued

| Example | C8.1 | C8.2 | C8.3 |
|---|---|---|---|
| Ultradur B4500 | 0 | 0 | 69.0 |
| Glass fiber PPG 3786 | 25 | 25.0 | 25.0 |
| Exolit OP 1240 | 8.0 | 6.0 | 6.0 |
| Melapur 200 | 2.5 | 0 | 0 |
| ranking | V0 | V0 | V- |
| burning t1 + t2 [s] | 5 | 10 | |
| Floor wadding inflamed | nein | nein | |

The comparison of C7.1 to C3.1 shows that use of poly(eBHDB-BD-terephthalate)—Ex. 3.3 in stead of PBT results in superior flame resistance.

Example 9

| Example | C9.1 | C9.2 | C9.3 | C9.4 |
|---|---|---|---|---|
| Ultramid B24 | 65.8 | 51.8 | 70.0 | 60.0 |
| poly(eBHDB-BD-terephthalate) - Ex. 3.6 | 0 | 20.0 | 0 | 0 |
| poly(eBHDB-BD-terephthalate) - Ex. 2 | 0 | 0 | 0 | 10.0 |
| Glass fiber DS 1110 | 21.6 | 15.6 | 25.0 | 25.0 |
| Aluminumhypophosphite | 12.6 | 12.6 | 0 | 0 |
| Exolit OP1240 | 0 | 0 | 0 | 0 |
| Melapur 200 | 0 | 0 | 0 | 0 |
| Red phosphorus | 0 | 0 | 5.0 | 5.0 |
| ranking | V- | V0 | V- | V-1 |
| burning t1 + t2 [s] | | 8 | | 23 |
| Floor wadding inflamed | | no | | no |

Example 9 shows that melt blending of PA6 with eBHDB based co-polyester can significantly improve flame retardancy. C9.2 shows a V0 rating and was easy to process. C9.4 shows how the FR effect of red phosphorus, usually used in PA66 not PA6, is improved by melt blending PA6 with the product of Example 2.

The invention claimed is:
1. A flame retardant thermoplastic polymer molding composition, comprising
   a) 0.1 to 80 wt.-% of at least one thermoplastic polyamide or polyester, different from component B, as component A,
   b) 5 to 50 wt.-% of at least one thermoplastic polyester based on at least one aromatic dicarboxylic acid, 1,2-bis[4-(2-hydroxyethoxy)phenyl]ethanone and at least one $C_{2-12}$-diol, as monomers, wherein the molar ratio of 1,2-bis[4-(2-hydroxyethoxy)phenyl]ethanone to $C_{2-12}$-diol is in the range of from 0.1:0.9 to 0.95:0.05 as component B,
   c) 1 to 35 wt.-% of at least one flame retardant additive, selected from phosphorus containing flame retardant additives and halogen containing flame retardant additives, as component C,
   d) 0.1 to 25 wt.-% of at least one flame retardant synergist, different from component C, selected from nitrogen compounds, metal borates, metal stannates and metal oxides, as component D,
   e) 0 to 60 wt.-% of glass fibers as component E,
   f) 0 to 30 wt.-% of at least one further additive, as component F,
   wherein the total amount of components A to F is 100 wt.-%.
2. The molding composition of claim 1, wherein component C is an aluminum salt of phosphinic acid or di-$C_{1-6}$-alkyl phosphinic acid, or wherein C is a brominated poly- styrene, brominated polybenzyl acrylate or brominated Bisphenol-A-containing polymer.

3. The molding composition of claim 1, wherein component D is melamine polyphosphate or melamine cyanurate.

4. A process for the preparation of the molding composition of claim 1, comprising mixing the components of the molding composition.

5. A method for the production of moldings, fibers or foils, comprising processing a molding composition of claim 1 into the desired form.

6. A molding, a fiber, or a foil comprising the thermoplastic molding composition of claim 1.

7. A thermoplastic polyester based on at least one aromatic dicarboxylic acid, 1,2-bis[4-(2-hydroxyethoxy)phenyl]ethanone and at least one $C_{2-12}$-diol, as monomers, wherein the molar ratio of 1,2-bis[4-(2-hydroxyethoxy)phenyl]ethanone to further $C_{2-12}$-diol is in the range of from 0.1:0.9 to 0.95:0.05.

8. The thermoplastic polyester of claim 7, wherein the dicarboxylic acid is terephthalic acid.

9. A process for producing the thermoplastic polyester of claim 7 by polycondensation of at least one aromatic dicarboxylic acid, 1,2-bis[4-(2-hydroxyethoxy)phenyl]ethanone and at least one $C_{2-12}$-diol, as monomers, or by transesterification of an ester containing one of the monomers with the other monomers.

* * * * *